(12) United States Patent
Kim et al.

(10) Patent No.: US 7,859,274 B2
(45) Date of Patent: Dec. 28, 2010

(54) SYSTEM FOR TESTING A FLAT PANEL DISPLAY DEVICE AND METHOD THEREOF

(75) Inventors: Byung-Uk Kim, Gyeonggi-do (KR); Ki-Beom Lee, Gyeonggi-do (KR); Yong-Woo Kim, Gyeonggi-do (KR); Mi-Sun Park, Gyeonggi-do (KR); Jin-Sup Hong, Gyeonggi-do (KR); Wy-Yong Kim, Gyeonggi-do (KR)

(73) Assignee: Dongjin Semichem Co., Ltd., Incheon (KR)

( * ) Notice: Subject to any disclaimer, the term of this patent is extended or adjusted under 35 U.S.C. 154(b) by 122 days.

(21) Appl. No.: 12/279,066

(22) PCT Filed: Feb. 15, 2007

(86) PCT No.: PCT/KR2007/000814

§ 371 (c)(1),
(2), (4) Date: Aug. 12, 2008

(87) PCT Pub. No.: WO2007/094627

PCT Pub. Date: Aug. 23, 2007

(65) Prior Publication Data

US 2009/0224777 A1    Sep. 10, 2009

(30) Foreign Application Priority Data

Feb. 15, 2006  (KR) ............... 10-2006-0014568
Feb. 15, 2007  (KR) ............... 10-2007-0015691

(51) Int. Cl.
*G01R 31/302*  (2006.01)
*G01R 31/305*  (2006.01)
*G01R 31/28*   (2006.01)

(52) U.S. Cl. ............... 324/750; 324/770; 324/158.1; 324/751; 250/310

(58) Field of Classification Search ......... 324/750–770; 250/310

See application file for complete search history.

(56) References Cited

U.S. PATENT DOCUMENTS 5,586,058 A    12/1996  Aloni et al.
5,717,780 A *   2/1998  Mitsumune et al. ......... 382/141

(Continued)

FOREIGN PATENT DOCUMENTS

JP    2001124661    5/2001

(Continued)

*Primary Examiner*—Ha Tran T Nguyen
*Assistant Examiner*—Emily Y Chan
(74) *Attorney, Agent, or Firm*—Gifford, Krass, Sprinkle, Anderson & Citkowski, P.C.

(57) ABSTRACT

A system for testing a flat panel display having a flat display panel assembly includes a testing stage for arranging the flat display panel assembly, a measuring apparatus being disposed on the testing stage and for measuring a spectrum of a transmitted light passing through a measuring region of the flat display panel assembly from a light source, a transporting apparatus for moving the measuring apparatus at a constant acceleration on the testing stage, a defect informing apparatus being electrically connected to the measuring apparatus and for informing an existence of defect, a type of defect, and a severity of defect by processing an electrical signal of the spectrum transmitted from the measuring apparatus.

23 Claims, 7 Drawing Sheets

U.S. PATENT DOCUMENTS

| | | | |
|---|---|---|---|
| 6,281,697 B1 * | 8/2001 | Masuda et al. | 324/765 |
| 6,362,820 B1 | 3/2002 | Hoppe | |
| 6,798,231 B2 * | 9/2004 | Iwasaki et al. | 324/770 |
| 7,468,611 B2 * | 12/2008 | Nguyen et al. | 324/754 |

FOREIGN PATENT DOCUMENTS

JP    2005062148    3/2005

* cited by examiner

[FIG. 1]
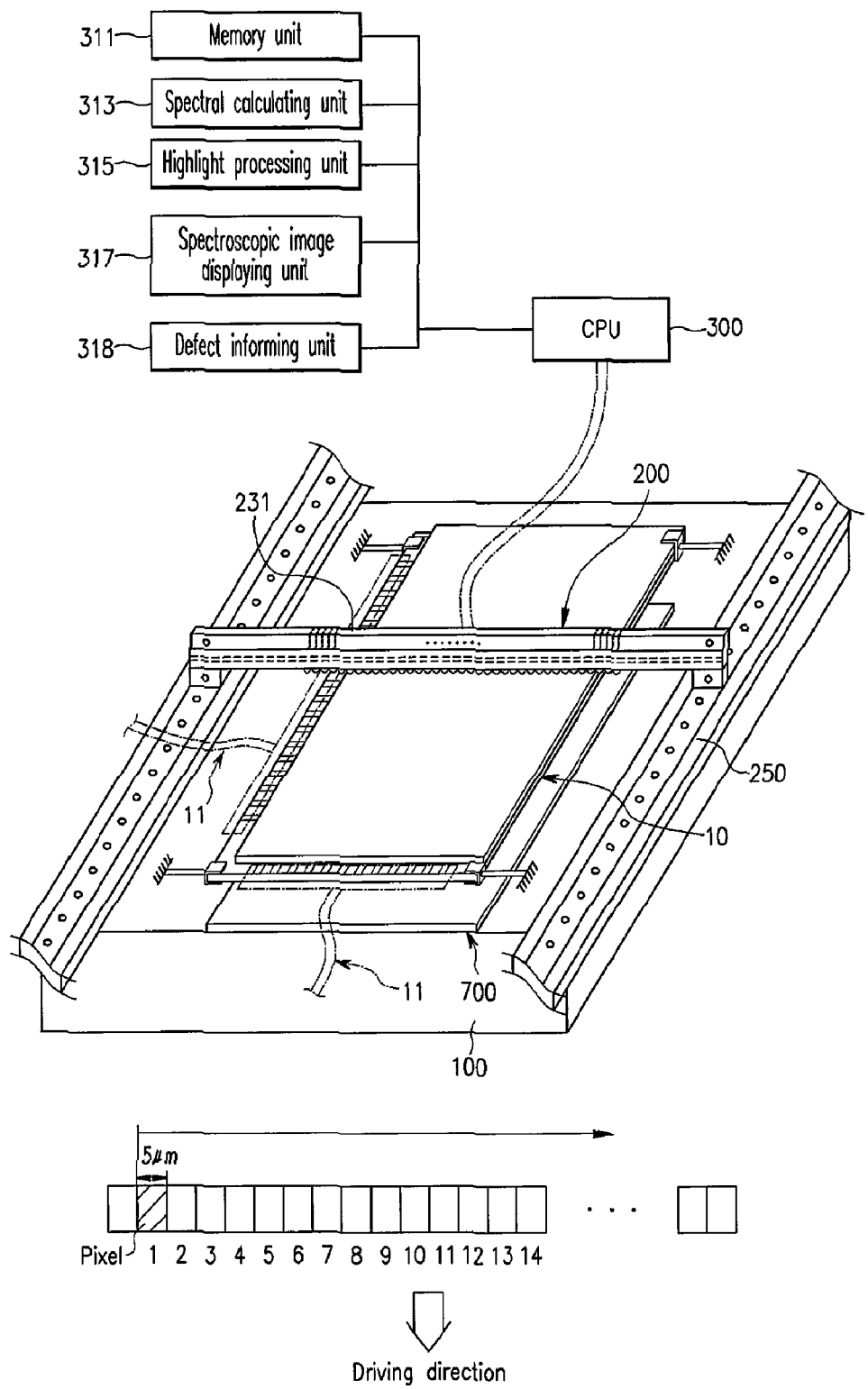

[FIG. 2]
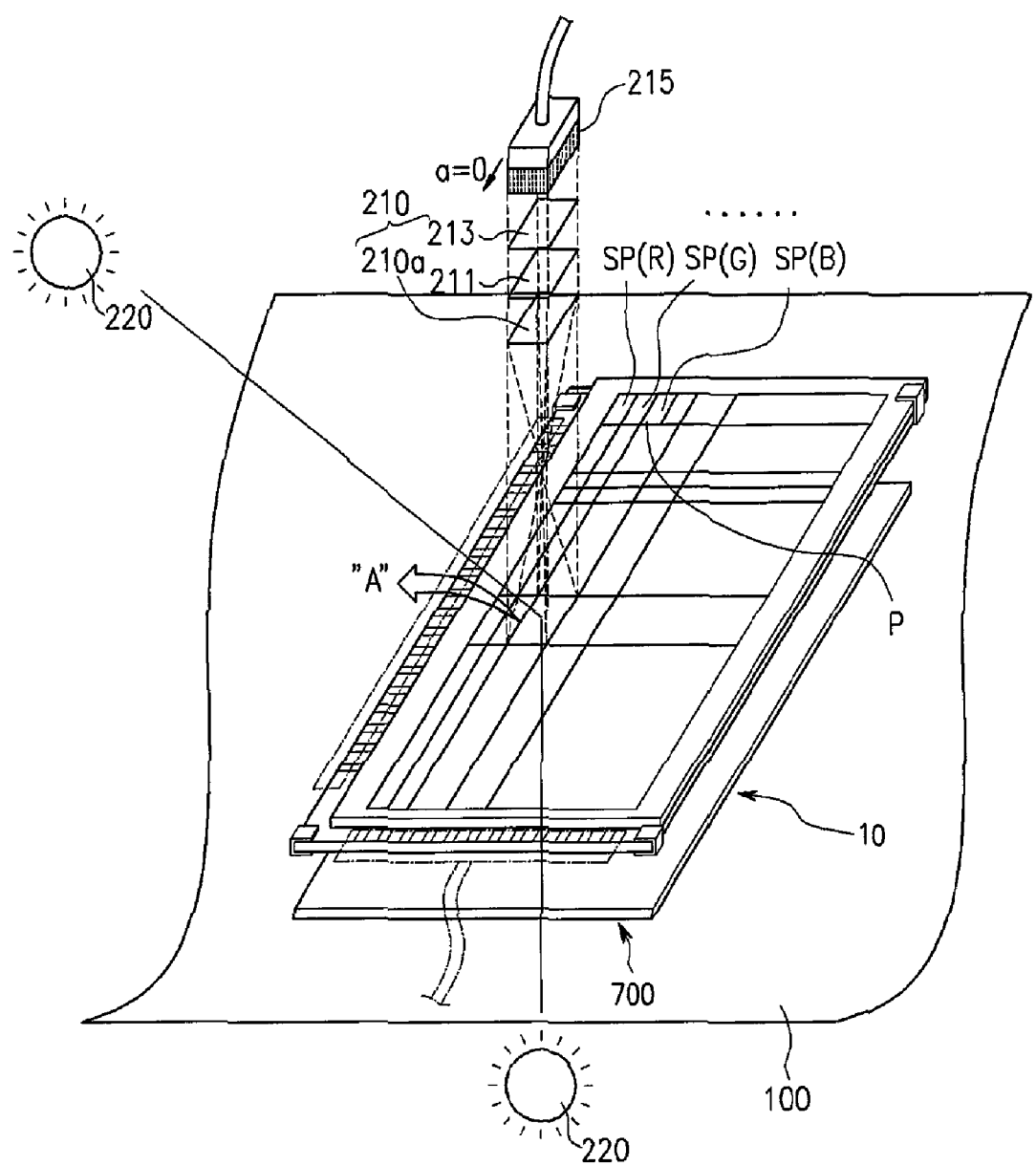

[FIG. 3]
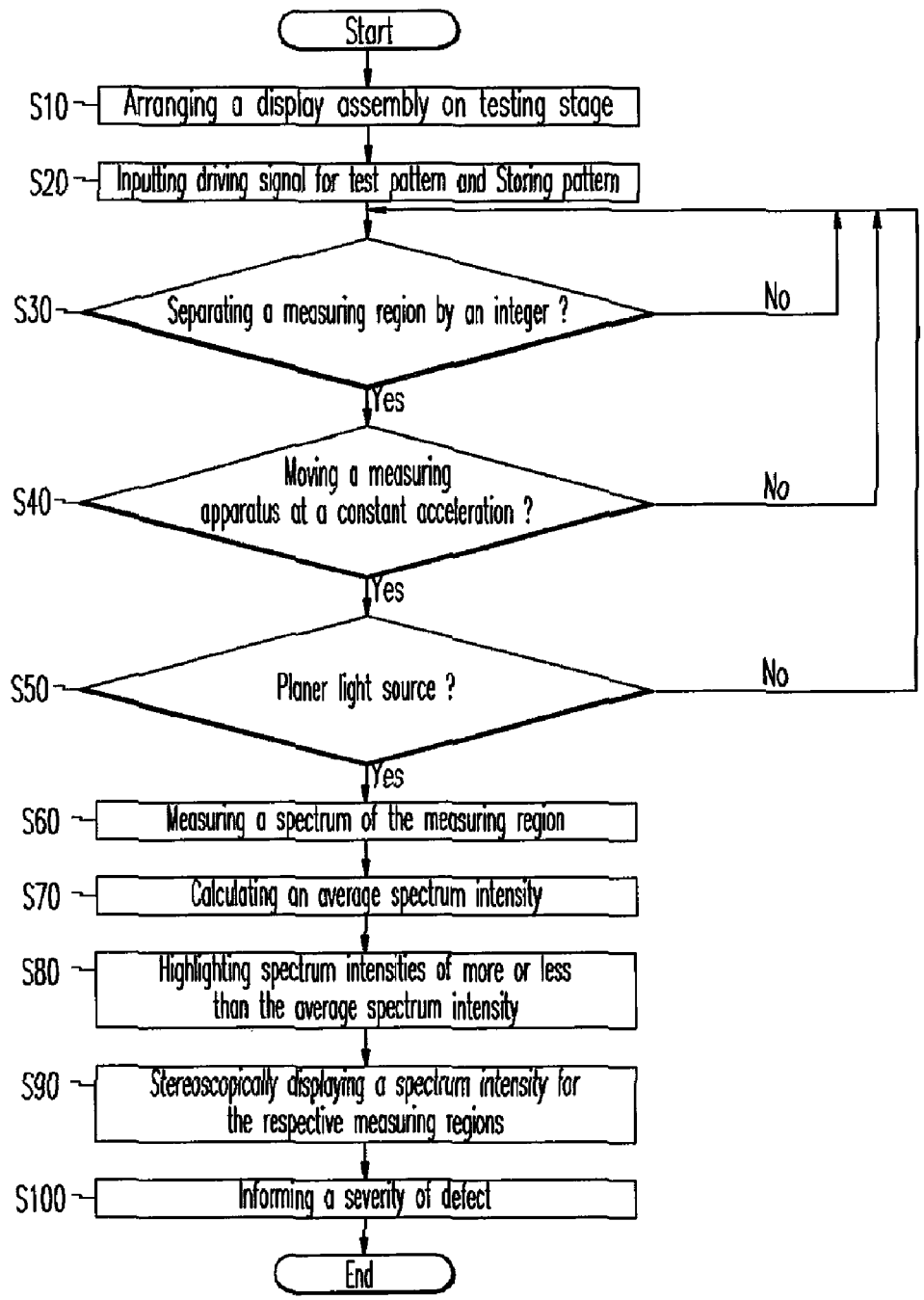

[FIG. 4A]
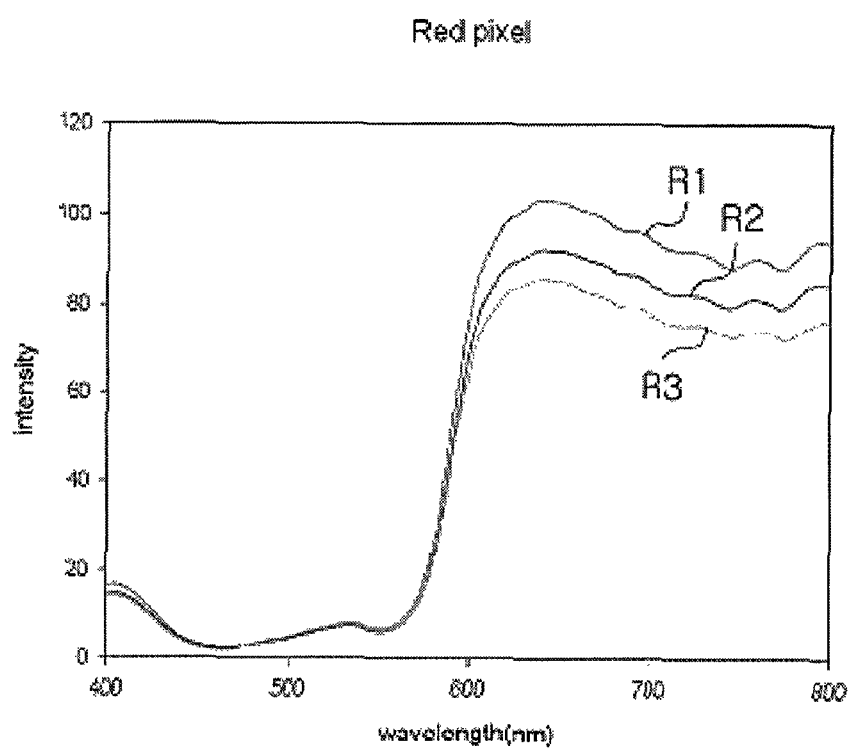
[FIG. 4B]
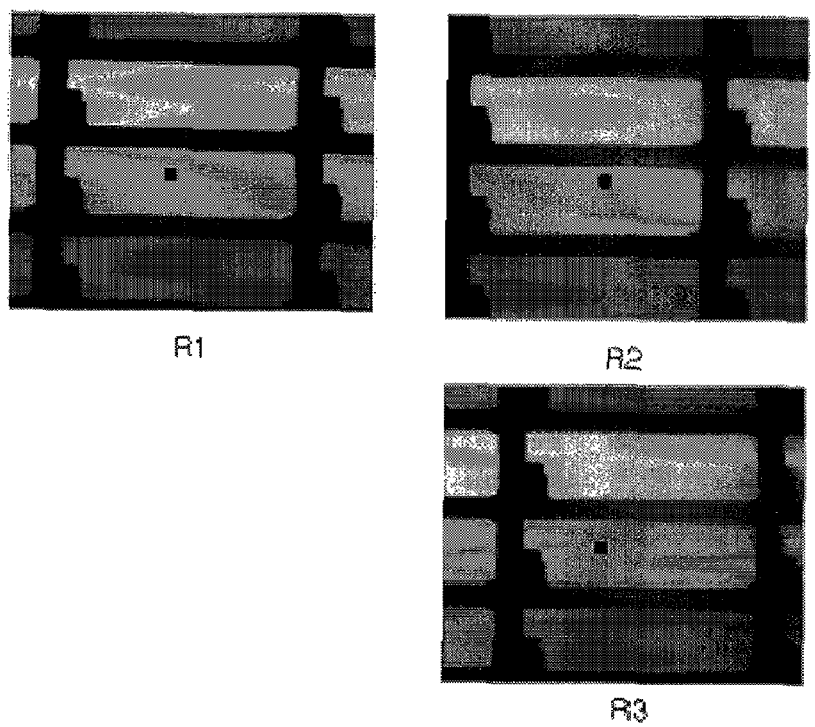

[FIG. 5A]
Green Pixel
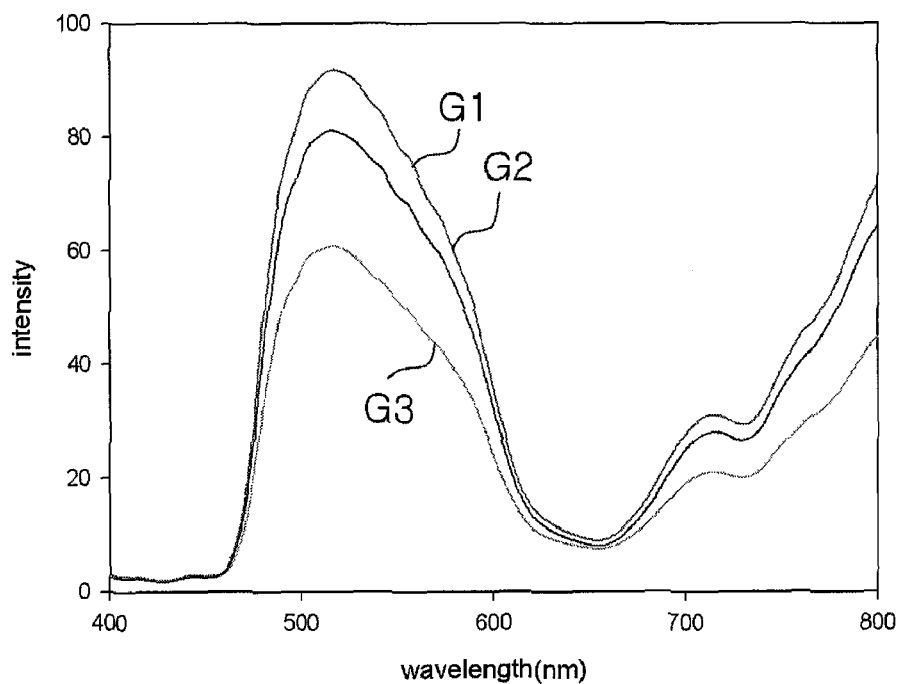
[FIG. 5B]
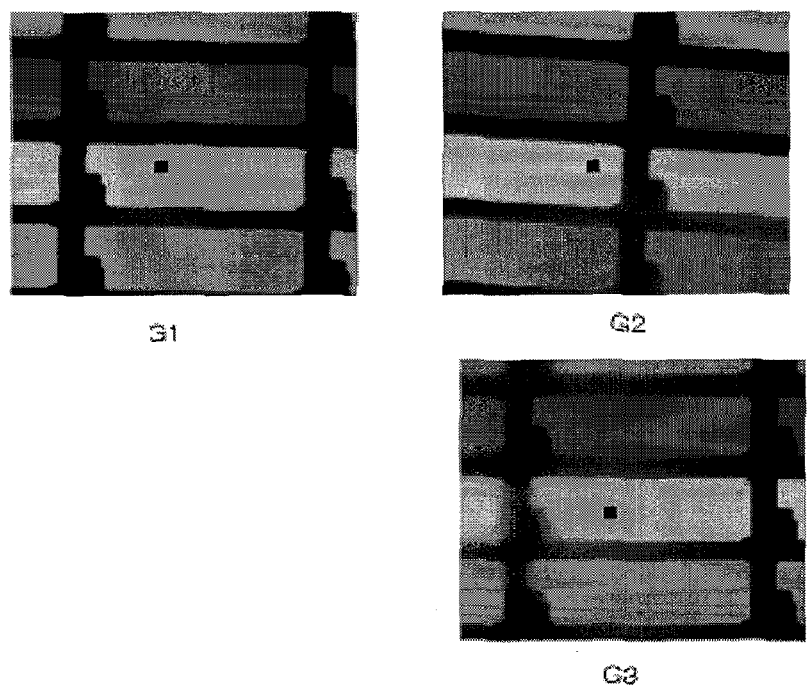

[FIG. 6A]
Blue pixel
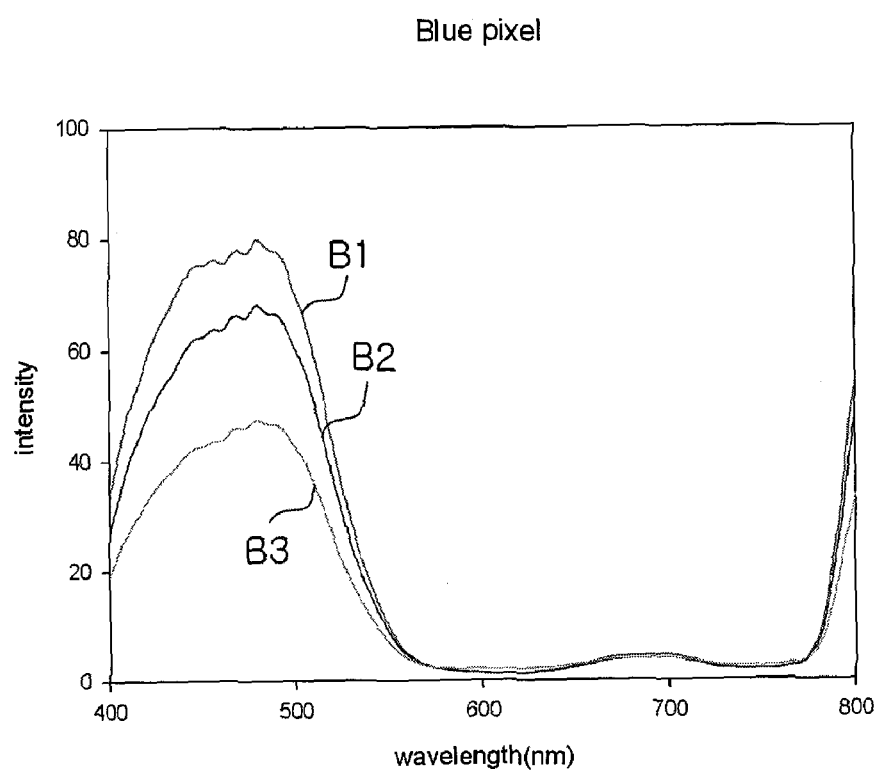
[FIG. 6B]
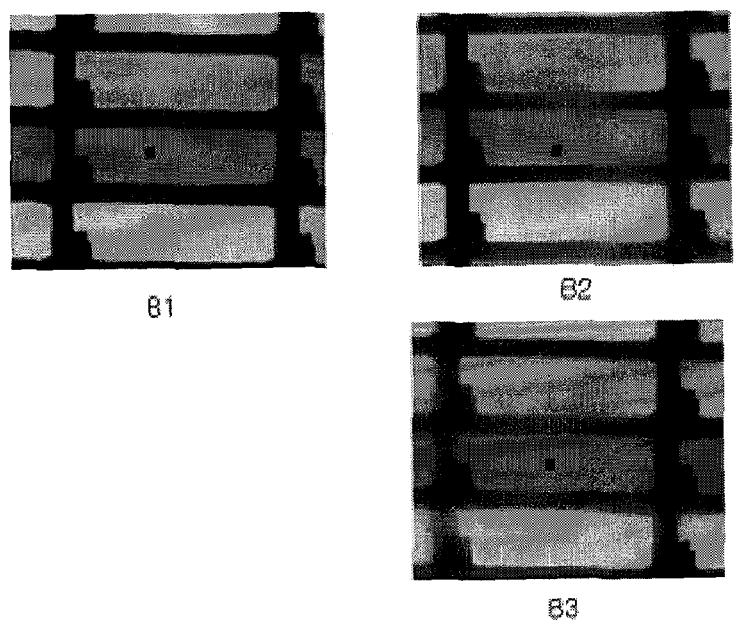
B1
B2
B3

[FIG. 7]
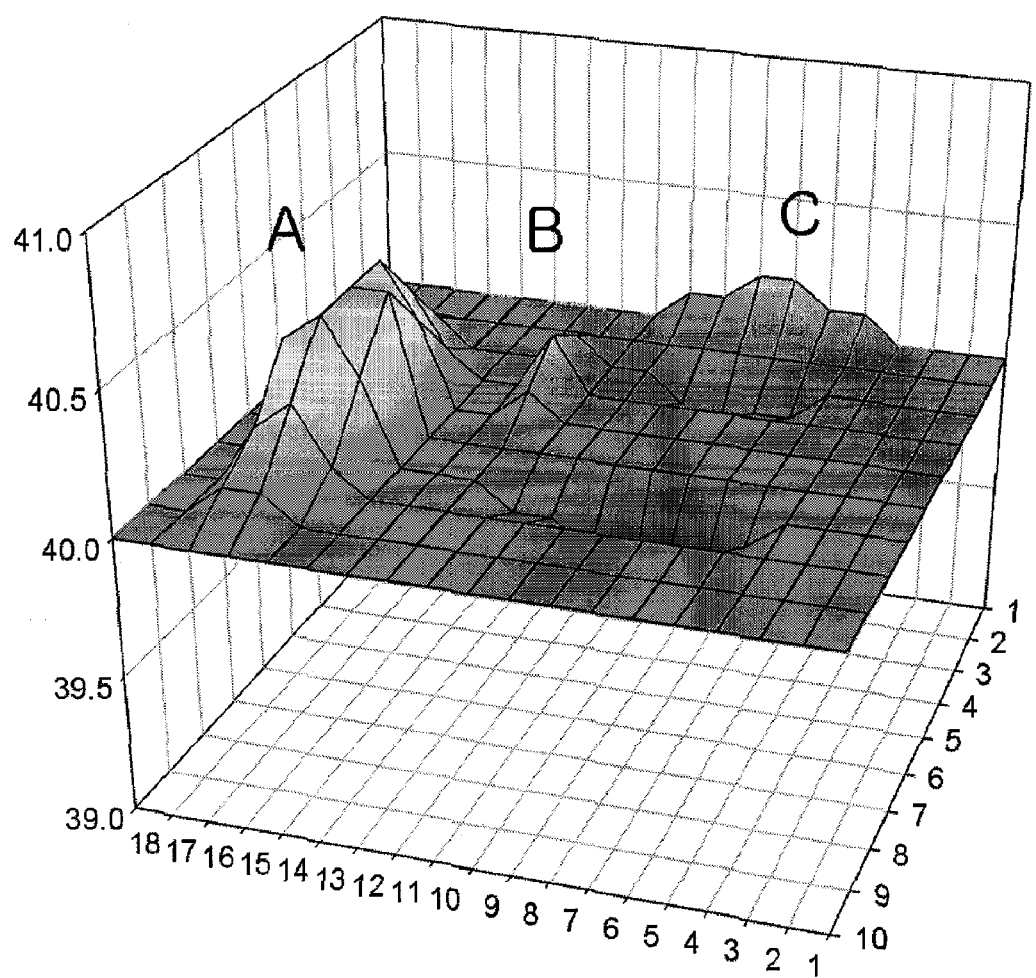

SYSTEM FOR TESTING A FLAT PANEL DISPLAY DEVICE AND METHOD THEREOF

CROSS-REFERENCE TO RELATED APPLICATIONS

This application is the U.S. national phase of PCT/KR2007/000814 filed Feb. 15, 2007, which claims priority of Korean Patent Application No. 10-2006-0014568 filed Feb. 15, 2006 and Korean Patent Application No. 10-2007-0015691 filed Feb. 15, 2007.

BACKGROUND OF THE INVENTION (a) Field of the Invention

The present invention relates to a system for testing a flat panel display and method thereof. More particularly, the present invention relates to a system for testing a flat panel display and method thereof capable of determining a defect or inferiority for the respective pixels by analyzing a spectrum which respectively passes through a plurality of pixels periodically arranged on the flat panel display.

(b) Description of the Related Art

Generally, a flat panel display may include a liquid crystal display (LCD), a plasma display device (PDP), an organic electroluminescence display device (OLED), and a field emission display (FED). The liquid crystal display has been most actively researched because it has a high resolution and it has an enough fast response speed to realize a motion picture. The liquid crystal display includes a color filter display panel having a common electrode and a color filter or the like formed thereon, a thin film transistor display panel having a pixel electrode and a thin film transistor or the like formed thereon, a liquid crystal material injected between the color filter display panel and a thin film transistor display panel. The liquid crystal molecules having a dielectric anisotropy are rotated according to an electric field applied between the common electrode and the pixel electrode. Accordingly, an image information voltage applied to the pixel electrode is controlled while a predetermined voltage is applied to the common electrode, and then the liquid crystal molecules may transmit light or block light for the respective pixels thereby displaying a character or an image. The color filter display panel and the thin film transistor display panel are assembled in a vacuum and then the assembled are cut as a unit panel. Such a unit panel is called as "a display panel assembly." In order to test the display panel assembly, a probe is respectively connected on the common electrode of the color filter display panel and the pixel electrode of the thin film transistor display panel and a driving signal is applied between the common electrode and the pixel electrode so that a test pattern is displayed on the display panel assembly, and then the defect or inferiority of the displayed test pattern is checked. Conventionally, the defect or the inferiority of the flat panel display is tested by observing an image displayed on the flat panel display using a naked eye or a microscope. However, such a testing method using the naked eye or the microscope may have drawbacks in that it requires a lot of times and labor as well as a yield difference may be occurred because a detector subjectively determines the defect or the inferiority. In addition, an automatic testing method using a television camera and an image processing technology has been well used. However, It has drawbacks in that it is expensive because it needs a high resolution and a high density television camera having a higher pixel density than that of the panel, the captured image is again observed by the naked eye so as to detect the defect or the inferiority on the flat display panel substrate. In addition, the testing methods using the naked eye, the microscope, or the conventional automatic testing apparatus has a limit of resolution, and accordingly, it cannot detect a fine smear or fine panel thickness inferiority. The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system for testing a flat panel display and method thereof having advantages of accurately and rapidly detecting a defect or inferiority of the flat panel display. The present invention has been made in an effort to provide a system for testing a flat panel display and method thereof having advantages of inexpensively detecting a fine smear or a fine thickens inferiority of the flat panel display without a high-resolution and high-density television camera. The present invention has been made in an effort to provide a system for testing a flat panel display and method thereof having advantages of automatically detecting a defect or inferiority of the flat panel display and having a superior performance. A system for testing a flat panel display having a flat display panel assembly according to an exemplary embodiment of the present invention includes a testing stage for arranging the flat display panel assembly thereon, a measuring apparatus being disposed on the testing stage and for measuring a spectrum of a light passing through a measuring region of the flat display panel assembly from a light source, a transporting apparatus for moving the measuring apparatus at a constant acceleration on the testing stage, a defect informing apparatus being electrically connected to the measuring apparatus and for informing an existence of defect, a type of defect, and a severity of defect by processing an electrical signal of the spectrum transmitted from the measuring apparatus. The measuring apparatus may include a case having a measuring head in a front thereof, the case including a focusing unit for focusing the transmitted light passing through the measuring region of the flat display panel assembly, a spectral unit for separating the collimated light into each wavelength, an photoelectrical conversion sensor absorbing the light separated into each wavelength and respectively converting the optical signal into an electrical signal, wherein the focusing unit is connected to the spectral unit by an optical fiber. The photoelectrical conversion sensor may be processed by one selecting from a group of an optical diode array, CCD, and CMOS. The focusing unit may include one of a focusing lens or a concave mirror and controls the measuring region. The case is formed in a bar in which the plurality of measuring heads detachably mounted.

The measuring apparatus may have both end portions connected with the transporting apparatus; the transporting apparatus may be driven by a step motor. The defect informing apparatus may includes a memory unit that stores optical data transmitted from the photoelectrical conversion sensor, a spectral calculating unit that calculates an average spectrum intensity according to the respective measuring regions using the data stored at the memory unit, a highlight processing unit that highlights the respective spectrum intensities of less or more than the average spectrum intensity when the respective spectrum intensities of the respective measuring regions are more than the average spectrum intensity, a stereoscopic image displaying unit that stereoscopically displays the respective spectrum intensities of the respective measuring regions, wherein the stereoscopic image displaying unit further includes an defect informing unit for comparing the respective spectrum intensities to the average spectrum intensity, determining an existence of defect, a type of defect, and a severity of defect based on a database of the memory unit and informing the same. The defect informing unit further includes a database according to patterns of defect, the database including a first smear of on the color filter display panel occurred due to the electric characteristic variance of the thin film transistor display panel of the liquid crystal panel assembly, a second defect occurred due to a thickness difference of a color filter formed on the color filter display panel of the liquid crystal panel assembly, a third smear occurred due to a thickness difference of a black matrix formed on formed on the color filter display panel of the liquid crystal panel assembly, a fourth smear scummed on the color filter display panel of the liquid crystal panel assembly, a fifth smear occurred due to a contamination of the liquid crystal panel assembly, a sixth smear occurred due to a contamination of liquid crystal molecules of the liquid crystal panel assembly, a seventh smear due to a bad alignment of the liquid crystal molecules of the liquid crystal panel assembly, and an eighth smear due to an error of alignment layer of the liquid crystal panel assembly, sorts the defects into what to be discarded or what to be recovered or what to be disregard. The light source may be a planar light source, and the light source has a wavelength of 200 nm to 2100 nm and being a white light source. A method for testing a flat panel display according to another exemplary embodiment of the present invention includes disposing the flat panel display assembly on a testing stage, applying a test driving signal such that the flat panel display assembly performs a test operation, adjusting a measuring apparatus on the flat panel display assembly such that a plurality of measuring regions of the flat panel display assembly are controlled, measuring a spectrum of a transmitted light passing through the flat panel display assembly from a light source, the light source being disposed under the flat panel display assembly, and transmitting the measured spectrum to a defect informing apparatus, wherein the defect informing apparatus obtaining an average spectrum intensity by overlapping the measured spectrums of the respective measuring regions and informing a defect when the spectrum intensities of the respective measuring regions are compared to the average spectrum intensity and are less or more than the average spectrum intensity. The informing of a defect may include highlighting the spectrum intensities of less or more than the average spectrum intensity. The informing of a defect may include stereoscopically displaying the spectrum intensities of less or more than the average spectrum intensity. The informing of a defect may include determining a severity of defect by comparing the spectrum intensities of the respective measuring regions to defect data information of the database and informing the determined severity of defect along with a type of the defect. When the measuring region has a shorter side m and a longer side n, the measuring region may be set such that the shorter side m is substantially the same as the longer side n. The highlighting of the spectrum intensities of less or more than the average spectrum intensity includes multiplying at least one of x, y, and z elements by an integer.

The measuring apparatus may be moved at a constant acceleration using a transporting apparatus mounted on the both end portions thereof. The flat display panel assembly may include a color filter panel, the plurality of measuring regions respectively being at least one sub-pixel or at least one pixel of the color filter panel. The measuring apparatus may include a convex lens for varying the measuring region. The defect informing unit informs at least one selecting from a defect information group of a first smear of on the color filter display panel occurred due to the electric characteristic variance of the thin film transistor display panel of the liquid crystal panel assembly, a second defect occurred due to a thickness difference of a color filter formed on the color filter display panel of the liquid crystal panel assembly, a third smear occurred due to a thickness difference of a black matrix formed on formed on the color filter display panel of the liquid crystal panel assembly, a fourth smear scummed on the color filter display panel of the liquid crystal panel assembly, a fifth smear occurred due to a contamination of the liquid crystal panel assembly, a sixth smear occurred due to a contamination of a liquid crystal molecule of the liquid crystal panel assembly, a seventh smear due to a bad arrangement of the liquid crystal molecules of the liquid crystal panel assembly, and an eighth smear due to an error of alignment layer of the liquid crystal panel assembly. The liquid crystal panel assembly includes a color filter display panel, a thin film transistor display panel, a liquid crystal material layer injected between the color filter display panel and a thin film transistor display panel, the measuring apparatus measures a thickness thereof, a thickness of a thin film transistor formed on the thin film transistor panel, a thickness of a color filter and black matrix formed on the color filter film, and a thickness of optical compensation panel by means of a difference between the electrical signal and the reference signal stored at a database of a memory unit. The above information disclosed in this Background section is only for enhancement of understanding of the background of the invention and therefore it may contain information that does not form the prior art that is already known in this country to a person of ordinary skill in the art.

BRIEF DESCRIPTION OF THE DRAWINGS

FIG. 1 is a perspective view schematically showing a system for testing a flat panel display according to an exemplary embodiment of the present invention.

FIG. 2 is a perspective view schematically showing a measuring apparatus of a system for testing a flat panel display according to an exemplary embodiment of the present invention.

FIG. 3 is a flowchart for showing how to test a flat panel display according to an exemplary embodiment of the present invention.

FIGS. 4A and 4B are respectively a periodic pattern of red sub-pixels having a defect on the respective different positions thereof and a graph showing a spectrum distribution of a light passing through red sub-pixels having a defect on the respective different positions thereof.

FIGS. 5A and 5B are respectively a periodic pattern of green sub-pixels having a defect on the respective different positions thereof and a graph showing a spectrum distribution of a light passing through green sub-pixels having a defect on the respective different positions thereof.

FIGS. 6A and 6B are respectively a periodic pattern of blue sub-pixels having a defect on the respective different positions thereof and a graph showing a spectrum distribution of a light transmitted through blue sub-pixels having a defect on the respective different positions thereof.

FIG. 7 stereoscopically illustrates a spectrum distribution for the respective display units of a flat plane display assembly displayed by a stereoscopic image unit of a system for testing a flat panel display according to an exemplary embodiment of the present invention.

DETAILED DESCRIPTION OF THE EMBODIMENTS

As those skilled in the art would realize, the described embodiments may be modified in various different ways, all without departing from the spirit or scope of the present invention. Particularly, according to an exemplary embodiment of the present invention, it is one example that it is applied for a passive liquid crystal display, but is not limited thereto, and accordingly, it may be used to detect a defect or an inferiority of an active liquid crystal display, a plasma display device, an organic electro luminescence display device (OLED), and a field emission display device (FED).

According to an exemplary embodiment of the present invention, the defect or inferiority of the liquid crystal display may include a black dot, that is, a black dot defect which the light may not pass through at the white state, a bright dot defect which the light may pass through at the black state, a line defect which a black dot defect or blight dot defect is formed in a line, and a display smear which some images are displayed in a different contrast and chromaticity.

FIG. 1 is a perspective view schematically showing a system for testing a flat panel display according to an exemplary embodiment of the present invention and FIG. 2 is a perspective view schematically showing a measuring apparatus of a system for testing a flat panel display according to an exemplary embodiment of the present invention.

As shown in FIG. 1 and FIG. 2, a system 1 for testing a flat panel display according to an exemplary embodiment of the present invention includes a testing stage 100 for maintaining a target to be tested, a liquid crystal panel assembly 10 thereon, a measuring apparatus 200 for ejecting a light toward the liquid crystal panel assembly 10 disposed on the testing stage 100 and measuring a spectrum of the light received therefrom, a defect informing apparatus 300 for receiving the spectrum measured from the measuring apparatus 200, that is, optical data as an electrical signal, storing the same in a database, highlighting at least one element, and stereoscopically displaying a spectrum for the respective pixels of the liquid crystal panel assembly 10. According to an exemplary embodiment of the present invention, the system 1 for testing the flat panel display may include a liquid crystal panel assembly driving unit 11 for applying a driving signal to the common electrode and the pixel electrode of the liquid crystal panel assembly 10, selecting the predetermined plurality of pixels on the liquid crystal panel assembly 10, and displaying a test pattern. Accordingly, when the predetermined pixels are selected on the liquid crystal panel assembly 10 and the test pattern is displayed, minimum defects or fine inferiorities as a color smear may be checked. The liquid crystal panel assembly driving unit 11 includes a plurality of probes contacted on the electrodes of the liquid crystal panel assembly 10. The driving signal is applied to the electrodes of the liquid crystal panel assembly 10, the predetermined pixels are selected on the liquid crystal panel assembly 10, and the test pattern is displayed. The testing stage 100 may be a UVW stage capable of being moved according to X-axis, Y-axis, and an angle Θ between X-axis and Y-axis. When the testing stage 100 is used as a UVW stage, the testing stage 100 may arrange a measuring heads 210 of the measuring apparatus 200 in correspondence with a measuring region A of the liquid crystal panel assembly 10, and accordingly, a measuring error due to a difference of a light path may be reduced. The measuring apparatus 200 includes the measuring head 210, a transporting unit 250 for transporting the measuring head 210 in a predetermined direction, and a light source 220 for ejecting a light to a light-accepting surface 210a of the measuring head 210 in one direction. The measuring head 210 includes a focusing unit 211 for focusing a light passing through a liquid crystal panel assembly 10, a dispersing unit 213 for dispersing a spectrum of the light, and an photoelectric conversion sensor 215 for converting the dispersed spectrum into an electrical signal.

The light source 220 may be disposed over the testing stage 100. At this time, it may use a light reflected from the liquid crystal panel assembly 10. More specifically, the light source 220 may have a wavelength of 200 nm to 2100 nm including a UV-range of light emitted from the liquid crystal panel assembly display. In addition, the light source 220 may use a backlight (not shown) mounted on a rear surface of the liquid crystal panel assembly. According to an exemplary embodiment of the present invention, a planer light source may be used so as to prevent a measuring error occurred when a different light path between the light source 220 and the measuring apparatus 200 is provided. The planar light source may be formed by combining a series of lenses or by using a polarizer or a light guide plate 700. The light source 220 may be a white light using a short-wavelength laser or UV lamp. The light irradiated from the light source 220 is passed through the liquid crystal panel assembly 10. The light passed through the liquid crystal panel assembly 10 is received into the focusing unit 211 through the measuring head 210 of the measuring apparatus 200. The dispersing unit 213 separates the collimated light into the light of different wavelengths. In more detail, the dispersing unit 213 includes a prism for separating the light passing through it into different wavelengths. The photoelectric conversion sensor 215 is a sensor smaller than a pixel unit, absorbs the light separated into the different wavelengths, and respectively converts the light into the respective electrical signals. It may be processed by a photo diode array, charge coupled device (CCD), and CMOS. The measuring head 210 is detachably mounted in a bar-shaped case 231 and a plurality of measuring head 210 may be simultaneously driven by a transporting unit 250 and a plurality of measuring regions may be simultaneously measured. The case 231 may include electrical contacts in a series therein. Accordingly, the measuring head 210 is detachably inserted into the case 231 in correspondence with the corresponding contacts, and accordingly, any one of the measuring head 210 may be replaced when it become deteriorated or damaged. It is preferable that a size of the measuring head 210 and the number of the photoelectric conversion sensors are determined to have the same pixel density as that of the liquid crystal panel assembly. Accordingly, the measuring head 210 need not have a higher resolution and a higher density than those of the liquid crystal panel assembly. In addition, the measuring head 210 may include a convex lens so that it may measure a larger measuring region by means of the upward movement of the convex lens. That is, when the convex lens is moved in an upward or downward, the size of the measuring region may be controlled. Accordingly, the measuring region may include 10-numbered pixels or 5-numbered pixels. The photoelectrical conversion sensors 215 are electrically connected to the defect informing apparatus 300. The defect informing apparatus 300 may be CPU etc., and may include a memory unit 311 that stores optical data transmitted from the photoelectrical conversion sensor 215, a spectral calculating unit 313 that calculates an average spectrum intensity of the respective measuring regions using the optical data stored at the memory unit 311, a highlight processing unit 315 that highlights the respective spectrum intensities of less or more than the average spectrum intensity when the respective spectrum intensities of the respective measuring regions are less or more than the average spectrum intensity, a stereoscopic image displaying unit 317 that stereoscopically displays the respective spectrum intensities of the respective measuring regions. The stereoscopic image displaying unit 317 further includes a defect informing unit 318 for comparing the spectrum intensities according to the respective measuring regions with the average spectrum intensity, determining an existence of defect, a type of defect, and a severity of defect, and informing the same. As shown in FIG. 2, the measuring region may be at least one sub-pixel (SP) or at least one pixel (P). In a color filter CF, the sub-pixel indicates the respective red, grin, blue color filters and the pixel (P) indicates a pair of the red, grin, blue color filters. According to an exemplary embodiment of the present invention, a defect for each pixel may be in the least measured. In addition, the memory unit 311 may further include a database of patterns according to the types of the defect, the database stores data information including a first smear of on the color filter display panel occurred due to the electric characteristic variance of the thin film transistor display panel of the liquid crystal panel assembly, a second defect occurred due to a thickness difference of a color filter formed on the color filter display panel of the liquid crystal panel assembly, a third smear occurred due to a thickness difference of a black matrix formed on formed on the color filter display panel of the liquid crystal panel assembly, a fourth smear scummed on the color filter display panel of the liquid crystal panel assembly, a fifth smear occurred due to a contamination of the liquid crystal panel assembly, a sixth smear occurred due to a contamination of a liquid crystal molecule of the liquid crystal panel assembly, a seventh smear due to a bad arrangement of the liquid crystal molecules of the liquid crystal panel assembly, and an eighth smear due to an error of alignment layer of the liquid crystal panel assembly, sorts the defects into what to be discarded or what to be recovered or what to be disregard among the data. The defect informing unit 318 informs the data highlighted by a color or a sound about what to be discarded or what to be recovered or what to be disregard among the defect data based on the database. How to test a flat panel display according to an exemplary embodiment of the present invention is described with reference to FIG. 3 to FIG. 7. FIG. 3 is a flowchart for showing how to test a flat panel display according to an exemplary embodiment of the present invention. FIGS. 4A and 4B, FIGS. 5A and 5B, and FIGS. 6A and 6B are respectively a periodic pattern of red, green, blue sub-pixels having a defect on the respective different positions thereof and a graph showing a spectrum distribution of a light transmitted through red, green, blue sub-pixels having a defect on the respective different positions thereof. Referring to FIG. 3, the liquid crystal panel assembly 10 is arranged on the test stage 100 (S10), the electrode portions such as the common electrode and the pixel electrode of the liquid crystal panel assembly 10 are applied with a driving signal by the liquid crystal panel assembly driving unit 11 so that a test pattern is formed on the liquid crystal panel assembly 10 (S20). For example, when a dot or line defect is to be detected, all pixels are turned off or turned on, that is, a spectrum of the light passing through the liquid crystal panel assembly 10 may be detected at the black or white state. As shown in FIGS. 4A and 4B, FIGS. 5A and 5B, and FIGS. 6A and 6B, when a periodic pattern of red, green, blue sub-pixels has a defect on the respective different positions thereof, it can be known that a spectrum distribution of a light transmitted through the respective red, green, blue sub-pixels having a defect on the respective different positions thereof are respectively different from each other. The sub-pixels or pixels selected by the test pattern is defined as a plurality of the measuring region A and the measuring apparatus 200 is adjusted so as to simultaneously test the plurality of measuring regions (S30). At this time, the red, green and blue color filters for filtering three lights are periodically disposed on the liquid crystal display panel and the pixel is substantially formed in a square pattern, and accordingly, it is preferable that the measuring region A is determined as a pixel unit because a light combination ratio of the lights passing through the red, green, and blue color filters may not be changed according to the measuring positions although two or more filters are simultaneously included in the measuring region. That is, when a shorter side of the measuring region A is defined as m and a longer side of the measuring region A is defined as n, it is preferable that the measuring region may be separated such that m is the substantially same as n because the difference of light combination ratio may be decreased. The measuring region A may be controlled by adjusting the convex lens upwardly or downwardly, and the case 231 of the measuring apparatus 200 is moved upwardly or downwardly so that the plurality of measuring heads are simultaneously collimated. It is determined that the measuring head is disposed in correspondence with the measuring region A, that is, it is determined that the measuring region A includes 2n-numbered pixels, for example, one pixel, two pixels, four pixels, . . . , and it is determined that the case 231 having the measuring heads mounted therein are moved at a constant acceleration (S40). It is determined that an incident light is in parallel from the light source 225 (S50). That is, the flat display panel begins to be tested after the measuring apparatus and the light source are aligned, thus the flat display panel may be rapidly tested without a camera having a higher resolution. The spectrum intensity measured in this manner is stored at the memory unit 311 (S60), the spectral calculating unit 313 obtains an average spectrum intensity of the respective measuring regions (S70), and the highlight processing unit 315 determines whether the measured spectrum intensities of the respective measuring regions are less or more than the average spectrum intensity and then highlights the spectrum intensities of the measuring region measuring regions of less or more than the average spectrum intensity by multiplying the same by an integer or by coloring in the same (S80). For example, according to an exemplary embodiment of the present invention, when the one pixel is set as the measuring region, the average value of the 10-numbered pixels may be the same spectrum intensity as that of the one pixel because the pixels are periodically arranged. Accordingly, the average value may be obtained without measuring the entire pixels of the liquid crystal panel assembly. In addition, when the measuring regions are given as 10-numbered pixels and the average value thereof is given as 100, the measuring region having the spectrum intensity of lower than 100, for example 90 is selected among the plurality of measuring regions. Continuously, the measuring regions are given as 5-numbered pixels and the average spectrum intensities thereof are compared and the corresponding measuring regions of lower or more than the average spectrum intensity are searched, and accordingly, when the measuring regions are repeatedly reduced, and ultimately the defect or inferiority of at least one pixel may be accurately detected. Accordingly, it may be accurately performed because the spectrum intensity of each pixel is compared to the average spectrum intensity of the measuring regions as well as a testing of the flat display panel may be rapidly performed because the measuring region includes the plurality of pixels and the plurality of measuring regions are simultaneously detected. The stereoscopic image display unit 317 stereoscopically displays the values calculated for each measuring regions by the spectral calculating unit 313 and the highlight processing unit 315 (S90). Thus, a detector may detect an even color smear by highlighting the same and by stereoscopically displaying the same, which is difficult to detect the same because a brightness difference thereof is much small due to a fine thickness difference of the film. Meanwhile, the defect informing unit 318 compares the electrical signal or the spectrum intensity of the measuring region transmitted from the photoelectric conversion sensor 215 to the data of the database stored at the memory unit 311 and informs an existence of defect, a type of defect, and a severity of defect in colors or sounds (S100). That is, the defect informing unit 318 may inform a first smear of on the color filter display panel occurred due to the electric characteristic variance of the thin film transistor display panel of the liquid crystal panel assembly, a second defect occurred due to a thickness difference of a color filter formed on the color filter display panel of the liquid crystal panel assembly, a third smear occurred due to a thickness difference of a black matrix formed on formed on the color filter display panel of the liquid crystal panel assembly, a fourth smear scummed on the color filter display panel of the liquid crystal panel assembly, a fifth smear occurred due to a contamination of the liquid crystal panel assembly, a sixth smear occurred due to a contamination of a liquid crystal molecule of the liquid crystal panel assembly, a seventh smear due to a bad arrangement of the liquid crystal molecules of the liquid crystal panel assembly, and an eighth smear due to an error of alignment layer of the liquid crystal panel assembly, stored and sorted according to the types of the defect in the database, informs what to be discarded or what to be recovered or what to be disregard among the data. The defect informing unit 318 informs the highlighted data by a color or a sound by sorting what to be discarded or what to be recovered or what to be disregard among the defect data based on the database. FIG. 7 stereoscopically illustrates a spectrum distribution for the respective display units of a flat display assembly displayed by a stereoscopic image portion of a system for testing a flat panel display according to an exemplary embodiment of the present invention. As shown in FIG. 7, for example, the spectrums for the respective measuring regions are measured and compared to each other. That is, a defect area that the spectrum intensities are less or more than the average spectrum intensity, is over a predetermined range, which is defined as a line bright defect (A), a defect area that the spectrum intensities are less or more than the average spectrum is local, which is defined as a point bright defect (B), a defect area that the spectrum intensities are less or more than the average spectrum, is over a predetermined range and has a fluctuation over the predetermined range, that is, has a tendency of more than a predetermined distance, which is defined as a smear (C). According to an exemplary embodiment of the present invention, various defects for the respective measuring regions may be simultaneously displayed, and a type of defect and a severity of defect for the respective measuring regions may be determined so that whether to discard the corresponding display panel assembly may be determined. The defect informing apparatus 300 may inform a smear of on the color filter display panel occurred due to the electric characteristic variance of the thin film transistor display panel of the liquid crystal panel assembly, a defect occurred due to a thickness difference of a color filter formed on the color filter display panel of the liquid crystal panel assembly, a smear occurred due to a thickness difference of a black matrix formed on formed on the color filter display panel of the liquid crystal panel assembly, a smear scummed on the color filter display panel of the liquid crystal panel assembly, a smear occurred due to a contamination of the liquid crystal panel assembly, a smear occurred due to a contamination of a liquid crystal molecule of the liquid crystal panel assembly, a smear due to a bad arrangement of the liquid crystal molecules of the liquid crystal panel assembly, and an eighth smear due to an error of alignment layer of the liquid crystal panel assembly. When the liquid crystal panel assembly includes a color filter display panel, a thin film transistor display panel, a liquid crystal material layer injected between the color filter display panel and a thin film transistor display panel, the measuring apparatus measures a thickness thereof, a thickness of a thin film transistor formed on the thin film transistor panel, a thickness of a color filter and black matrix formed on the color filter film, and a thickness of optical compensation panel because the wavelength of the incident light of the liquid crystal material layer is varied according to any one of a thickness difference thereof, a thickness difference of a thin film transistor formed on the thin film transistor panel, a thickness difference of a color filter and black matrix formed on the color filter film, and a thickness difference of optical compensation panel, and checks the contamination thereof by means of the thickness difference thereof. It is well known that the wavelength of the incident light may be changed by means of a refractive index difference and a thickness difference, and accordingly, it will not be described in detail. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an exemplary embodiment of the present invention, a system for testing a flat panel display may have effects as follows. According to an exemplary embodiment of the present invention, a defect or inferiority of a flat panel display may be accurately detected. Particularly, the light passing the plurality of focusing lens are separated by the prism into each wavelength and the separated light are absorbed by the plurality of photo diode array, and accordingly, even a smear among image inferiorities displayed by the flat panel display may be accurately detected.

What is claimed is:

1. A system for testing a flat panel display having a flat display panel assembly, comprising:
   a testing stage for arranging the flat display panel assembly;
   a measuring apparatus being disposed on the testing stage and for measuring a spectrum of a transmitted light passing through a measuring region of the flat display panel assembly from a light source;
   a transporting apparatus for moving the measuring apparatus at a constant acceleration on the testing stage; and
   a defect informing apparatus being electrically connected to the measuring apparatus and for informing of an existence of a defect, a type of defect, and a severity of defect by processing an electrical signal of the spectrum transmitted from the measuring apparatus,
   wherein the measuring apparatus comprises a case having a plurality of measuring heads at a front thereof,
   the case including a focusing unit for focusing the transmitted light passing through the measuring region of the flat display panel assembly;
   a spectral unit for separating the collimated light into each wavelength; and a photoelectrical conversion sensor for absorbing the light that is separated into wavelengths and respectively converting the optical signals therefrom into an electrical signals, wherein the focusing unit is connected to the spectral unit by an optical fiber.

2. The system for testing a flat panel display of claim 1, wherein the photoelectrical conversion sensor is processed by one selected from a group of an optical diode array, a CCD, and a CMOS.

3. The system for testing a flat panel display of claim 1, wherein the focusing unit includes one of a focusing lens and a concave mirror and controls the measuring region.

4. The system for testing a flat panel display of claim 1, wherein the case is formed in a bar on which the plurality of measuring heads are detachably mounted.

5. The system for testing a flat panel display of claim 1, wherein the measuring apparatus has both end portions connected with the transporting apparatus, the transporting apparatus being driven by a step motor.

6. The system for testing a flat panel display of claim 1, wherein the defect informing apparatus further includes a memory unit that stores optical data transmitted from the photoelectrical conversion sensor, a spectral calculating unit that calculates an average spectrum intensity according to the respective measuring regions using the data stored at the memory unit, a highlight processing unit that highlights the respective spectrum intensities of less or more than the average spectrum intensity when the respective spectrum intensities of the respective measuring regions are less or more than the average spectrum intensity, and a stereoscopic image displaying unit that stereoscopically displays the respective spectrum intensities of the respective measuring regions, wherein the stereoscopic image displaying unit further includes an defect informing unit for comparing the respective spectrum intensities to the average spectrum intensity, determining an existence of a defect, a type of defect, and a severity of defect based on a database of the memory unit and informing of the same.

7. The system for testing a flat panel display of claim 6, wherein the defect informing unit further includes a database according to defect patterns, the database including data information including on a first smear of on the color filter display panel that occurs due to the electrical characteristic variance of the thin film transistor display panel of the liquid crystal panel assembly, a second defect that occurs due to a thickness difference of a color filter formed on the color filter display panel of the liquid crystal panel assembly, a third smear that occurs due to a thickness difference of a black matrix formed on formed on the color filter display panel of the liquid crystal panel assembly, a fourth smear scummed on the color filter display panel of the liquid crystal panel assembly, a fifth smear that occurs due to a contamination of the liquid crystal panel assembly, a sixth smear that occurs due to a contamination of a liquid crystal molecule of the liquid crystal panel assembly, a seventh smear that occurs due to a bad arrangement of the liquid crystal molecules of the liquid crystal panel assembly, and an eighth smear due to an error of an alignment layer of the liquid crystal panel assembly, and that sorts the defects into what is to be discarded, what to be recovered, and what to be disregard among the data.

8. The system for testing a flat panel display of claim 1, wherein the light source is a planar light source.

9. The system for testing a flat panel display of claim 8, wherein the light source has a wavelength of 200 nm to 2100 nm and is a white light source.

10. A method for testing a flat panel display comprising:

disposing the flat panel display assembly on a testing stage;

applying a test driving signal such that the flat panel display assembly performs a test operation;

adjusting a measuring apparatus on the flat panel display assembly such that a plurality of measuring regions of the flat panel display assembly are controlled;

measuring a spectrum of a transmitted light passing through the flat panel display assembly from a light source, the light source being disposed under the flat panel display assembly;

and transmitting the measured spectrum to a defect informing apparatus;

wherein the defect informing apparatus obtaining an average spectrum intensity by overlapping the measured spectrums of the respective measuring regions and informing of a defect when the spectrum intensities of the respective measuring regions are compared to the average spectrum intensity and are less or more than the average spectrum intensity.

11. The method for testing a flat panel display of claim 10, wherein the informing of a defect includes highlighting the spectrum intensities of less or more than the average spectrum intensity.

12. The method for testing a flat panel display of claim 10, wherein the informing of a defect includes stereoscopically displaying the spectrum intensities of less or more than the average spectrum intensity.

13. The method for testing a flat panel display of claim 10, wherein the informing of a defect includes determining a severity of defect by comparing the spectrum intensities of the respective measuring regions to defect data information of the database and informing the determined severity of defect along with a type of the defect.

14. The method for testing a flat panel display of claim 10, wherein when the measuring region has a shorter side m and a longer side n, the measuring region being set such that the shorter side m is substantially the same as the longer side n.

15. The method for testing a flat panel display of claim 10, wherein the highlighting of the spectrum intensities of less or more than the average spectrum intensity includes multiplying at least one of x, y, and z elements by an integer.

16. The method for testing a flat panel display of claim 10, wherein the measuring of a spectrum of a transmitted light passing through the flat panel display assembly from a light source includes controlling the light irradiated from the light source in parallel with respect to the measuring head without a difference of a light path.

17. The method for testing a flat panel display of claim 10, further comprising transporting the measuring apparatus at a constant acceleration using a transporting apparatus mounted on the both end portions thereof.

18. The method for testing a flat panel display of claim 10, wherein the flat display panel assembly includes a color filter panel and the plurality of measuring regions are respectively at least one sub-pixel of the color filter panel.

19. The method for testing a flat panel display of claim 18, wherein the plurality of measuring regions respectively are at least one pixel of the color filter panel.

20. The method for testing a flat panel display of claim 10, wherein the measuring apparatus includes a convex lens for varying the measuring region.

21. The method for testing a flat panel display of claim 10, wherein the defect informing unit informs at least one selecting from a defect information group of a first smear of on the color filter display panel that occurs due to the electrical characteristic variance of the thin film transistor display panel of the liquid crystal panel assembly, a second defect that occurs due to a thickness difference of a color filter formed on the color filter display panel of the liquid crystal panel assembly, a third smear that occurs due to a thickness difference of a black matrix formed on formed on the color filter display panel of the liquid crystal panel assembly, a fourth smear scummed on the color filter display panel of the liquid crystal panel assembly, a fifth smear that occurs due to a contamination of the liquid crystal panel assembly, a sixth smear that occurs due to a contamination of a liquid crystal molecule of the liquid crystal panel assembly, a seventh smear that occurs due to a bad arrangement of the liquid crystal molecules of the liquid crystal panel assembly, and an eighth smear due to an error of an alignment layer of the liquid crystal panel assembly, and that sorts the defects into what is to be discarded, what to be recovered, and what to be disregard among the data.

22. The method for testing a flat panel display of claim 10, wherein the liquid crystal panel assembly comprises a color filter display panel, a thin film transistor display panel, and a liquid crystal material layer injected between the color filter display panel and the thin film transistor display panel, wherein the measuring apparatus measures a thickness thereof, a thickness of a thin film transistor formed on the thin film transistor panel, a thickness of a color filter and black matrix formed on the color filter film, and a thickness of optical compensation panel by means of a difference between the electrical signal and the reference signal stored at a database of a memory unit.

23. A system for testing a flat panel display having a flat display panel assembly, comprising:
  a testing stage for arranging the flat display panel assembly;
  a measuring apparatus being disposed on the testing stage and for measuring a spectrum of a transmitted light passing through a measuring region of the flat display panel assembly from a light source;
  a transporting apparatus for moving the measuring apparatus at a constant acceleration on the testing stage; and
  a defect informing apparatus being electrically connected to the measuring apparatus and for informing of an existence of a defect, a type of defect, and a severity of defect by processing an electrical signal of the spectrum transmitted from the measuring apparatus,
  wherein the defect informing apparatus further includes a memory unit that stores optical data transmitted from the photoelectrical conversion sensor, a spectral calculating unit that calculates an average spectrum intensity according to the respective measuring regions using the data stored at the memory unit, a highlight processing unit that highlights the respective spectrum intensities of less or more than the average spectrum intensity when the respective spectrum intensities of the respective measuring regions are less or more than the average spectrum intensity, and a stereoscopic image displaying unit that stereoscopically displays the respective spectrum intensities of the respective measuring regions,
  wherein the stereoscopic image displaying unit further includes an defect informing unit for comparing the respective spectrum intensities to the average spectrum intensity, determining an existence of a defect, a type of defect, and a severity of defect based on a database of the memory unit and informing of the same.

* * * * *